United States Patent [19]

Philip et al.

[11] Patent Number: 4,756,761
[45] Date of Patent: Jul. 12, 1988

[54] METHODS OF MAKING CEMENTITIOUS COMPOSITIONS FROM WASTE PRODUCTS

[75] Inventors: T. Peter Philip, Wilton, Conn.; Anthony L. Hannaford, Nababeep Cape Providence; Ernst Konick, Kleinbrakrivier Cape Providence, both of South Africa

[73] Assignee: O'Okeip Copper Company Ltd., Nababeep, South Africa

[21] Appl. No.: 875,031

[22] Filed: Jun. 16, 1986

[51] Int. Cl.$^4$ .............................................. C04B 7/153
[52] U.S. Cl. .................................... 106/117; 106/109; 106/DIG. 1
[58] Field of Search .................... 106/117, DIG. 1, 109

[56] References Cited

U.S. PATENT DOCUMENTS

| | | | |
|---|---|---|---|
| 2,764,493 | 9/1956 | Vogelbeck | 106/55 |
| 3,122,513 | 2/1964 | Dempsey | 252/478 |
| 3,565,648 | 2/1971 | Mori et al. | 106/89 |
| 3,798,043 | 3/1974 | Wallouch | 106/64 |
| 3,825,433 | 1/1974 | Schneider-Arnoldi et al. | 106/89 |

FOREIGN PATENT DOCUMENTS

| | | | |
|---|---|---|---|
| 963482 | 2/1975 | Canada | 261/58 |
| 51-00522 | 1/1976 | Japan | 106/117 |
| 54-156032 | 12/1979 | Japan | 106/117 |
| 59-232958 | 12/1984 | Japan | 106/117 |
| 60-221351 | 11/1985 | Japan | 106/DIG. 1 |
| 61-48467 | 3/1986 | Japan | 106/117 |

OTHER PUBLICATIONS

Turriziani, R., "Aspects of the Chemistry of Pozzolanas," Chap. 14, *The Chemistry of Cements*, H. F. W. Taylor Ed., vol. 2, Academic Press (1964).
Nurse, R. W., "Slag Cements," Chap. 13, *The Chemistry of Cements*, H. F. W. Taylor, Ed., vol. 2, Academic Press, (1964).
Kramer, W., "Blast-Furnace Slags and Slag Cements," Paper VII-2, Fourth Int'l. Symp. on the Chem. of Cement, Wash. D.C., pp. 957-981, (1960).
Characterization of a Copper Slag Used in Mine Fill Operations, by Roper, Kamand Auld, pp. 1091-1109.
Use of Blast Furnace Slag as Mining Fill, by Metso, Makinen and Kajaus, pp. 1111-1122.
Cementitious Properties of Nonferrous Slags from Canadian Sources, by Douglas, Malhotra and Emery, pp. 3-14.
Filling Operations at Mount Isa, by Ashby and Hunter, pp. 41-53.
Fill Technology in Underground Metalloferrous Mines, by Thomas, Nantley and Notley; Chap. 7, pp. 209-225; Chap. 2, pp. 13-16.
The Study of a Non-Traditional Pozzolan: Copper Slags, by Barragano and Rey, pp. III-37 to III-42.
Utilization of Metallurgical Slags, by Emery, pp. 1-37.
ILZRO Project Number LC-270: Development of Cementitious Materials from Lead and Zinc Slags: Progress Reports 2-4, May-Dec., 1978, by Fasano, Ings and Ricciardi.
Characterization of Non-Ferrous Slags from Canadian Sources. Part I—Hydration of Cementitious Materials with Special Reference to Non-Ferrous Slags, by E. Douglas, Jun. 1983.
Non-Ferrous Slags from Canadian Sources. Part II—Properties and Strength Development, by Douglas and Malhotra, Jun. 1983.
Fineness, Glass Content and Pozzolanic Activity of Non-Ferrous Slags from Canadian Sources, by Douglas and Mainwaring, Jul. 1983.
Characterization of Non-Ferrous Slags from Canadian Sources by Douglas and Malhotra, Mar. 1984.
Research on the Hydraulicity of Granulated Blast Furnace Slags, Parts 1-3 by P. Terrier.
Article Regarding: Comparison of Pozzolanic Reactivity, by Regourd, Mortureux and Gautier, pp. 1-14.
Cemented Fill Practice and Research at Mount Isa by Thomas, Proc. Aus. Inst. Min. Met., No. 240, Dec. 1971, pp. 33-51.
Pozzolanic Behavior of Ground Isa Mine Slag in Cemented Hydraulic Mine Fill at High Slag/Cement Ratios, by Thomas and Cowling, pp. 129-138.
Stope Fill Developments at Mount Isa by Leahy and Cowling, pp. 21-29.
The Evolution of Fill Mining at the Ontario Division of Inco Metals, by Barsotti, pp. 37-41.
Falconbridge Slag as a Cementing Agent in Backfill, by A. McGuire, pp. 133-138.
Fill Permeability and its Significance in Mine Fill Practice, by E. G. Thomas, pp. 139-145.
Assessment of Slag Backfill Properties for the Noranda Chadbourne Project, by Nantel and Lecuyer, CIM Bulletin, Jan. 1983, pp. 57-60.
ILZRO Lead Research Digest, No. 37, 1979, pp. 30-32.
Bray, *Ferrous Production Metallurgy* "The Iron Blast Furnace", John Wiley and Sons, N.Y., 1942, pp. 156-159.
Butts, *Copper: The Science and Technology of the Metal, its Alloys and Compounds*, ACS Monograph Series, Chap. 6, pp. 138-148.
Bray, *Non-Ferrous Production Metallurgy*, John Wiley and Sons, N.Y., 1947, p. 33.
Douglas and Malhotra, A Review of the Properties and Strength Development of Non-Ferrous Slags and Portland Cement Binders, Report No. 85-7E by Canada Center for Mineral & Energy Technology.
Lee, Super Sulphated Cement, The Chemistry of Cement and Concrete, 3rd Ed. (1970).

*Primary Examiner*—Steven Capella
*Attorney, Agent, or Firm*—Pennie & Edmonds

[57] ABSTRACT

Methods for producing cementitious compositions from waste products, such as non-ferrous slags, or fossil fuel combustion residue, or ferrous slags, whereby the CaO and alumina contents of the waste products are adjusted as necessary to enable them to combine with a sulphate additive at elevated pH and so couple the faster reactions of the mineral Ettringite with the slower ones of the calcium silicates.

22 Claims, No Drawings

METHODS OF MAKING CEMENTITIOUS COMPOSITIONS FROM WASTE PRODUCTS

TECHNICAL FIELD

The invention relates to the use of various waste products in cementitious compositions, such as cemented mine backfill, or other stabilized earths. Such waste products may include ferrous or non-ferrous slags, as well as fossil fuel combustion residues.

BACKGROUND ART

By-products of metallurgical processes, such as slags which result from the smelting of both ferrous and non-ferrous ores, and combustion products of coal from fossil fuel powered generating stations, such as fly ash or clinker, all represent the product of a significant investment of energy which is normally lost upon the subsequent disposal of these materials, heretofore considered as waste.

The term 'slag' as used in this application refers to the vitreous mass which remains after the smelting of a metallic ore, a process which entails the reduction of the metallic constituents in the ore to a molten state.

The terms 'ferrous slag' or 'blast furnace slag' refer to that slag which remains after the smelting of iron ore. Alternately, 'non-ferrous slag' is that slag which remains after the smelting of a non-ferrous ore such as copper, nickel, lead, or zinc, whether it be done in a blast furnace or otherwise. Therefore, a slag considered non-ferrous in the metallurgical sense may contain appreciable amounts of iron due to the presence of this compound as an impurity within the ore.

Fly ash is a combustion product resulting from the burning of coal which has been ground to a relatively fine particle size. Coal which is not as finely ground produces both fly ash and a coarse, incombustible residue known as clinker.

Iron blast furnace slag, fly ash and various 'natural' slags and ashes have been known for some time to have pozzolanic properties. Waste industrial slags, however, do not contain the correct quantities of essential ingredients of Portland cements. Iron blast furnace slag comes closest with a $CaO/SiO_2$ ratio of approximately 1. To acquire such pozzolanic properties, however, such slags must be cooled to an amorphones (or highly vitreous) state by rapid quenching, such as by immersion in a large quantity of high pressure water. It is well known for example, that granulated blast-furnaces lag obtained in the production of pig iron can be mixed with Portland cement clinker and the mixture finely ground to bring out the inherent hydraulic properties of the slag.

In most applications today where ferrous slag or fly ash is used in backfilling, one finds a combination of a small quantity of Portland cement providing some initial set and strength, and slag or fly ash, which reacts with residual CaO from the cement reactions to form calcium silicates which provide the balance of the strength required over a period of time. To enable the use of non-ferrous slags as cement, however, the chemical composition of typical nonferrous slags must generally be modified to produce a product capable of competing with Portland cement, i.e. to one capable of achieving high early strength as well as a high ultimate strength within an acceptable time frame.

Applicants have determined that a higher quality, less expensive cemented backfill may be produced, without the use of Portland cement, by adjusting the proportions of both CaO and $Al_2O_3$ in non-ferrous slag. This adjustment then converts the slag from a 'low-grade' pozzolan to a 'high-grade' pozzolan wherein the necessary aluminate reaction can be harnessed by adjusting the sulphate ion and calcium hydroxide concentrations. Further, the methods for making cement from non-ferrous slag may also be extrapolated and used to prepare improved cements utilizing ferrous slags or fossil fuel combustion residues.

SUMMARY OF THE INVENTION

The invention relates to a method for making cementitious compositions from a residue of waste industrial products such as non-ferrous slags, fossil fuel combustion residue or ferrous slags. This method includes the step of grinding the vitreous waste residue whose composition may or may not have been altered by the addition of CaO and/or $Al_2O_3$, to a predetermined particle size, and adding calcium hydroxide or CaO, and a compound containing a sulphate anion to form a mixture with water, which is then allowed to cure to the final cementitious compositions.

The $Ca(OH)_2$ or CaO added after the waste residue has been ground is to raise the pH, in the presence of the water to an alkaline value to activate the alumina component and provide a high early strength.

Many countries, including the United States, Canada, Chile, South Africa, Australia and the Scandinavian countries, produce or export a great deal of both ferrous and non-ferrous metals. This results in the production of significant quantities of slag, produced as a by-product of the required smelting operations. Blast furnace slags are currently used as additives in some low strength concretes whereas, except for railway ballast and granular fill type applications, the feasibility of potential utilizations of non-ferrous slags and fly ashes has been comparatively disregarded, leading to the disposal of substantial quantities of these commodities with resulting large accumulations in areas surrounding the smelters and power stations.

The economic feasibility of sub-surface mining techniques depends upon an ability to fill the cavities created by the removal of the ore in order to establish and retain safe working conditions. One accepted technique for performing this function involves the addition of Portland cement of the fill to act as a binder in creating a hardened cementitious composition.

The Portland cements used in this manner are specially formulated to primarily comprise specific compounds, such as tri-calcium silicates, di-calcium silicates and tri-calcium aluminates which, on hydration, provide the desired cementing or binding action. The principal constituents of these Portland cements, i.e. CaO and $SiO_2$, are present in a high ratio of about 3:1 to strongly promote the calcium silicate reactions.

The difficulty and expense involved in transporting large quantities of Portland cement to often isolated mining locations has prompted a search for cheaper additives or substitutes which can reproduce the cementitious effect of Portland cement at a reduced cost. Thus, cemented fills introduce a broad new flexibility into mine planning and design; however, cost considerations limit potential applications. Any means of reducing cemented fill costs for a given fill duty, therefore, broadens the potential application for the material.

In general, if a lower cost binder whiich allows the formation of a slurry with mine tailings and/or sand at the same viscosity as that of a Portland cement slurry and which develops adequate compressive strength in adequate times to prevent collapse was available, lower grade orebodies could be mined economically. Applicants' invention serves just such a function.

The class of materials described under the broad term of 'pozzolans' offers potential cost savings in cemented fill practice. A pozzolan is any material which can provide silica to react with calcium hydroxide in the presence of water to form stable, insoluble cementitious hydrated calcium silicates, or related, more complex silicates. The silicates formed by pozzolanic action are closely related to some of those formed by the hydration of Portland cement.

A preferred particle size is between 2500 and 5000 Blaine, although larger or smaller particles will work in this invention. A preferred pH range is between about 10 and 14 and this range is achieved by the addition of an alkaline compound.

The curing of samples must be done under enclosed conditions at saturated humidity.

The application of heat during mixing and curing of samples greatly enhances the strength/time relationship and temperature is a very important parameter in the successful application of the invention.

In these methods, a predetermined amount of Portland cement, aggregate, fillers, tailings, or other inert material can be added to the mixture prior to adding the water.

The compound containing CaO or $Al_2O_3$ may be added to a furnace during the generation of the slag, or it may be added to said slag after the slag has been formed and before it is granulated. A preferred CaO containing compound is lime for both composition modification and pH adjustment. A preferred $Al_2O_3$ containing compound is fly ash. Also, preferred compounds containing a sulphate anion include sodium sulphate or gypsum.

Finally, the invention relates to the cementitious compositions produced by the previously described methods.

DETAILED DESCRIPTION OF THE PREFERRED EMBODIMENTS

As one skilled in the art would realize, the chemical analysis of various slags from either ferros or non-ferrous ore smelting operations as well as that of the fly ash or clinker which results from fossil fuel combustion, can vary over a wide range. Average typical analyses for such materials are set forth in Table I. This table includes the major components of the slags, but a minor amount of additional components such as metal oxides, sulphides, etc. may also be present.

TABLE I

COMPOSITION OF TYPICAL SLAGS

| | Weight Percent | | | |
|---|---|---|---|---|
| | CaO | $SiO_2$ | $Al_2O_3$ | $Fe_2O_3$ |
| Nickel Reverberatory Slag | 2–10 | 32–36 | 2–10 | 44–56 |
| Copper Reverberatory Slag | 1–8 | 33–40 | 2–10 | 47–50 |
| Iron Blast Furnace Slag | 35–50 | 28–38 | 10–20 | 3–5 |
| Non-Ferrous Blast Furnace Slag | 15–20 | 32–38 | 2–10 | 30–40 |
| Fossil Fuel Combustion Residue (Fly Ash) | 2–15 | 38–67 | 15–38 | 3–13 |

The present invention relates to a composition and a method for obtaining useful cementitious products comprised of such waste residues by adjusting and balancing various important components to control the cementitious reactions in the final compositions. As shown in Table I, non-ferrous slags typically have relatively low calcium oxide and alumina contents. Such amounts of calcium oxide and alumina are often insufficient to provide for the required calcium sulpho-aluminate and calcium silicate reactions and thus, such slags are not suitable for use on their own as cements unless their chemistry is appropriately modified.

Such a modification of the calcium oxide content can be carried out using a variety of methods. During the formation of slag in a furnace, additional lime or limestone may be added during the smelting process, with a corresponding increase in the final calcium oxide content of the slag. Similarly a modification of the aluminium oxide content can be achieved by the addition of, say fly ash, during the smelting process.

Once a slag of the correct composition has been made and granulated to a high glass content it must be ground, together with the gypsum if necessary, to a predetermined fineness, preferably between about 2500 and 5000 Blaine.

Thus, the addition of water and an alkaline material, preferably lime, serves to activate this composition. Differentiation is necessary, however, between lime used as an activator and lime added to the furnace feed to increase the CaO content of the slag, this being the lime which subsequently plays a major role in the cementitious reactions. It is necessary that this CaO be incorporated into the amorphous structure of the slag to enhance its disordered chemical state and increase its reactivity.

The alkaline material, added in order to activate the mixture, adjusts the pH upwardly to about twelve and allows the formation of gels and $AlO_2$ ions. Unless gypsum ($CaSO_4 2H_2O$) or some other sulphate ion containing materials are added, however, the alumina component remains unreactive. In order for the cementious compound to be successful, its alumina component chemistry must approach that of the compound Ettringite, a calcium monosulpho-aluminate compound with the approximate formula $Ca_6Al_2(So_4)_3(OH)_{12}.26H_2O$. The traditional 'pozzolanic' slag-lime-water system is generally deficient in sulphate radical and unless this added from some extraneous source, the desired cementitious reactions will not occur. It is possible that in certain ores, the sulphate radical may exist in the mill tailings in a form in which it would be available for the cementitious reactions but for most cases, additional sulphate ions must be added to the slag. Thus, it is critical to adjust the sulphate content to a range which, when combined with the other ingredients, provides the approximate stoichiometric ratio found in the mineral ettringite. The sulphate anion can be added as either gypsum or sodium sulphate or other.

The pH of the mix may be raised to the requird alkaline value by addition of an alkali metal hydroxide or other base, or by the addition of alkaline materials such as sodium carbonate, sodium bicarbonate or potash, provided they are accompanied by the addition of free lime.

By adjusting all of these components within the parameters stated above, a cementitious composition is formed, having a portion which forms ettringite-like structures, thus obtaining sufficient strength and stability in the final cementitious product.

With respect to ferrous slags, a similar procedure could be followed. Such slags, however, usually contain a much higher calcium oxide and alumina content than non-ferrous slags and their compositions would not need adjusting. the other steps described above would be followed in an essentially identical fashion to those for non-ferrous slags in order to achieve the desired cementitious compositions. Fly ash or other fossil fuel combustion residue would be treated in the same manner as ferrous slags.

As would be clearly understandable to one skilled in the art, the cementitious compositions of the present invention may be used alone, or they may be mixed with a wide variety of fillers, aggregate, accelerators, retarders or other additives. Also, such cementitious compositions can be substituted for all or a portion of the Portland cement component of ordinary cementitious compositions or concrete. Such cements can also be mixed with high aluminous cements, pozzolans or other materials to form specialty cements for specific applications.

While it is apparent that the invention disclosed herein is calculated to provide an improved cementitious system over those described in the prior art, it will be appreciated that alternate embodiments may be devised by those skilled in the art. It is therefore intended that the appended claims cover all modifications or embodiments as fall within the true spirit and scope of the present invention.

We claim:

1. A method for making a cementitious composition which comprises:
    adding to a waste residue of a non-ferrous slag, a fossil fuel combustion residue or a mixture thereof during its formation in a furnace or burner a compound containing CaO and a compound containing $Al_2O_3$ to form a first mixture having a sufficient CaO and $Al_2O_3$ content to enable said first mixture to react with a composition comprising a sulfate anion, added therto during a subsequent treatment step, to form a composition having pozzolanic qualities attainable with ettringite;
    increasing the pH of the first mixture to a sufficiently alkaline value to activate the alumina component of said first mixture; and
    treating said first mixture by the additive thereto of a compound containing a sulphate anion so as to form a second mixture, the proportional relationship among the CaO, $Al_2O_3$ and sulphate components in said second mixture being such that the ratio thereamong approaches the stoichiometric relation of the components of the mineral ettringite so as to obtain the pozzolanic qualities of ettrigite, thus forming a cementitious composition.

2. The method of claim 1 which further comprises grinding said first mixture to a particle size of between about 2,500 and 5,000 Blaine, prior to increasing the pH thereof.

3. The method of claim 1 wherein the pH of said first mixture is adjusted to between about 10 and 14 by addition of an alkaline compound.

4. The method of claim 1 which further comprises adding an amount of Portland cement to the first mixture sufficient to impart additional strength to the cementitious composition formed therefrom.

5. The method of claim 1 which further comprises adding aggregate, filler or tailings to said first mixture.

6. The method of claim 1 wherein said compound containing CaO is added to furnace or said burner during the formation of the waste residue.

7. The method of claim 2 wherein additional CaO is added to said slag after said slag is ground.

8. The method of claim 1 wherein said compound containing CaO is lime.

9. The method of claim 1 wherein said compound containing a sulphate anion is an alkali metal sulphate, or gypsum.

10. The method of claim 1 which further comprises curing the second mixture to obtain a solid cementitious composition.

11. A method for making a cementitious composition which comprises:
    adding to a waste residue of a non-ferrous slag, a fossil fuel combustion residue or a mixture thereof during its formation in a furnace or burner a compound containing CaO and a compound containing $Al_2O_3$ to form a first mixture having a sufficient CaO and $Al_2O_3$ content to enable said first mixture to react with a composition comprising a sulphate anion, added thereto during a subsequent treatment step, to form a composition having pozzolanic qualities attainable by ettringite;
    grinding said first mixture so as to reduce the particle size thereof;
    increasing the pH of the first mixture to a sufficiently alkaline value by the addition of an alkaline compound to activate the alumina component of said first mixture and thus to provide said first mixture with a high early strength;
    adding to said first mixture a compound containing a sulphate anion and an additional amount of said compound containing CaO to form a second mixture;
    hydrating said second mixture with a sufficient quantity of water such that the proportional relationship among the CaO, $Al_2O_3$ and sulphate components in said second mixture is such that the ratio thereamong approaches the stoichiometric relation of the components of the mineral ettringite; and
    allowing the second mixture to cure to a solid cementitious composition having the pozzolanic qualities of ettringite.

12. A method for making a cementitious composition which comprises:
    adding to a waste residue of a non-ferrous slag, a fossil fuel combustion residue or a mixture thereof during its formation in a furnace or burner a compound containing CaO and a compound containing $Al_2O_3$ having a sufficient CaO and $Al_2O_3$ content to enable said first mixture to react with a composition comprising a sulphate anion, added thereto during subsequent treatment step, to form a composition having increased pozzolanic qualities compared to the untreated waste residue;
    increasing the pH of the first mixture to a sufficiently alkaline value to activate the alumina component of said first mixture; and
    treating said first mixture by the addition thereto of a compound containing a sulphate anion so as to form a second mixture, the proportional relationship among the CaO, $Al_2O_3$ and sulphate components in said second mixture forms a cementitious composition capable of being hydrated to a higher-grade pozzolanic material as compared to the untreated waste residue.

13. The method of claim 12 wherein said slag is ground to a particle size of between about 2500 and 5000 Blaine.

14. The method of claim 12 wherein the pH is adjusted to between about 10 and 14 by addition of an alkaline compound.

15. The method of claim 12 which further comprises adding an amount of Portland cement to the first mixture sufficient to impart additional strength to the cementitious composition formed therefrom.

16. The method of claim 12 which further comprises adding aggregate, filler or tailings to said first mixture.

17. The method of claim 12 wherein said compound containing CaO is added to said furnace or said burner during the formation of the waste residue.

18. The method of claim 13 wherein additional CaO is added to said slag after said slag is ground.

19. The method of claim 12 wherein said compound containing CaO is lime.

20. The method of claim 12 wherein said compound containing a sulphate anion is an alkali metal sulphate or gypsum.

21. The method of claim 12 which further comprises curing the second mixture to obtain a solid cementitious composition.

22. A method for making a cementitious composition which comprises:

adding to a waste residue of a non-ferrous slag, a fossil fuel combustion residue or a mixture thereof during its formation in a furnace or burner, a compound containing CaO and a compound containing $Al_2O_3$ to form a first mixture having a sufficient CaO and $Al_2O_3$ content to enable said first mixture to react with a composition comprising a sulfate anion, added thereto during a subsequent treatment step, to form a composition having increased pozzolanic qualities as compared to the untreated waste residue;

grinding said first mixture so as to reduce the particle size thereof;

increasing the pH of the first mixture to a sufficiently alkaline value by the addition of an alkaline compound to activate the alumina component of said first mixture and thus to provide said first mixture with a high early strength;

adding to said first mixture a compound containing a sulphate anion and an additional amount of said compound containing CaO to form a second mixture;

hydrating said second mixture with a sufficient quantity of water such that the proportional relationship among the CaO, $Al_2O_3$ and sulphate components in said second mixture forms a cementitious composition of a higher-grade pozzolanic material as compared to that obtainable from the untreated waste residue; and allowing said second mixture to cure so as to form a solid cementitious composition.

* * * * *